United States Patent
Jain et al.

(10) Patent No.: US 6,282,274 B1
(45) Date of Patent: Aug. 28, 2001

(54) SELECTABLE BILLING OPTIONS FOR A SINGLE COMMUNICATIONS ACCOUNT

(75) Inventors: Ravi Jain, Hoboken; Richard Saul Wolff, West Caldwell, both of NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/350,708

(22) Filed: Jul. 9, 1999

(51) Int. Cl.⁷ .............................. H04M 15/00; H04M 3/32
(52) U.S. Cl. ........................ 379/114; 379/112; 379/201; 379/216; 455/406
(58) Field of Search .................................. 379/201, 207, 379/216, 220, 221, 222, 112, 113, 114, 115; 455/405, 406, 407, 408

(56) References Cited

U.S. PATENT DOCUMENTS

| | | | |
|---|---|---|---|
| 5,003,584 | 3/1991 | Benyacar et al. | 379/119 |
| 5,146,491 | 9/1992 | Silver et al. | 379/114 |
| 5,206,899 * | 4/1993 | Gupta et al. | 379/120 |
| 5,381,467 | 1/1995 | Rosinski et al. | 379/121 |
| 5,440,620 | 8/1995 | Slusky | 379/100 |
| 5,452,350 * | 9/1995 | Raynolds et al. | 379/220 |
| 5,666,405 * | 9/1997 | Weber | 379/127 |
| 5,694,459 | 12/1997 | Backaus et al. | 379/427 |
| 5,703,935 * | 12/1997 | Raissyan et al. | 379/211 |
| 5,754,633 | 5/1998 | Levy | 379/114 |
| 5,758,281 | 5/1998 | Emery et al. | 455/428 |
| 5,774,533 | 6/1998 | Patel | 379/127 |
| 5,805,680 | 9/1998 | Penzias | 379/118 |
| 5,859,900 | 1/1999 | Bauer et al. | 379/144 |
| 5,978,450 * | 11/1999 | McAllister et al. | 379/207 |
| 5,982,864 * | 11/1999 | Jagadish et al. | 379/115 |
| 6,055,305 * | 4/2000 | Norman et al. | 379/210 |
| 6,067,347 | 5/2000 | Farris et al. | 379/88.01 |
| 6,072,867 * | 6/2000 | Lieuwen | 379/220 |

* cited by examiner

*Primary Examiner*—Curtis Kuntz
*Assistant Examiner*—Quoc D. Tran
(74) *Attorney, Agent, or Firm*—Joseph Giordano; Orville R. Cockings

(57) ABSTRACT

The present invention, referred to herein as Personal Billing Selection, enables a telecommunications service subscriber to designate billing options for outgoing and incoming calls on a per-call basis, even if the subscriber's account includes several numbers and/or addresses. The present invention also preferably allows users to designate default billing accounts on a per-number basis. The subscriber may have a plurality of service accounts established in a database such as service profile. Calls for personal use and calls for other uses (e.g., business calls, separate client accounts, etc.) may be distinguished on a per-call basis by the call originator for outgoing calls or by the call recipient for incoming calls if the recipient is billed for incoming calls. For both outgoing and incoming calls, network usage is automatically allocated to the appropriate service account.

16 Claims, 5 Drawing Sheets

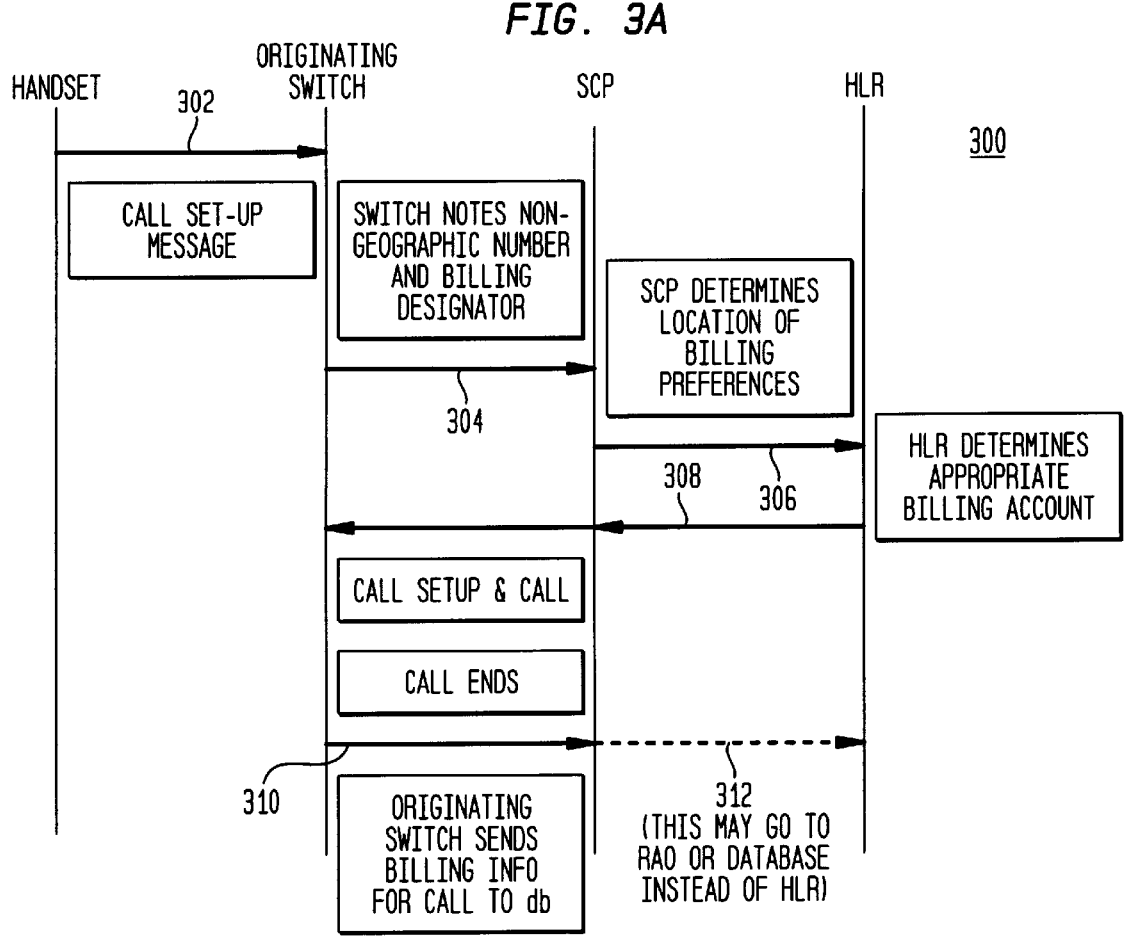
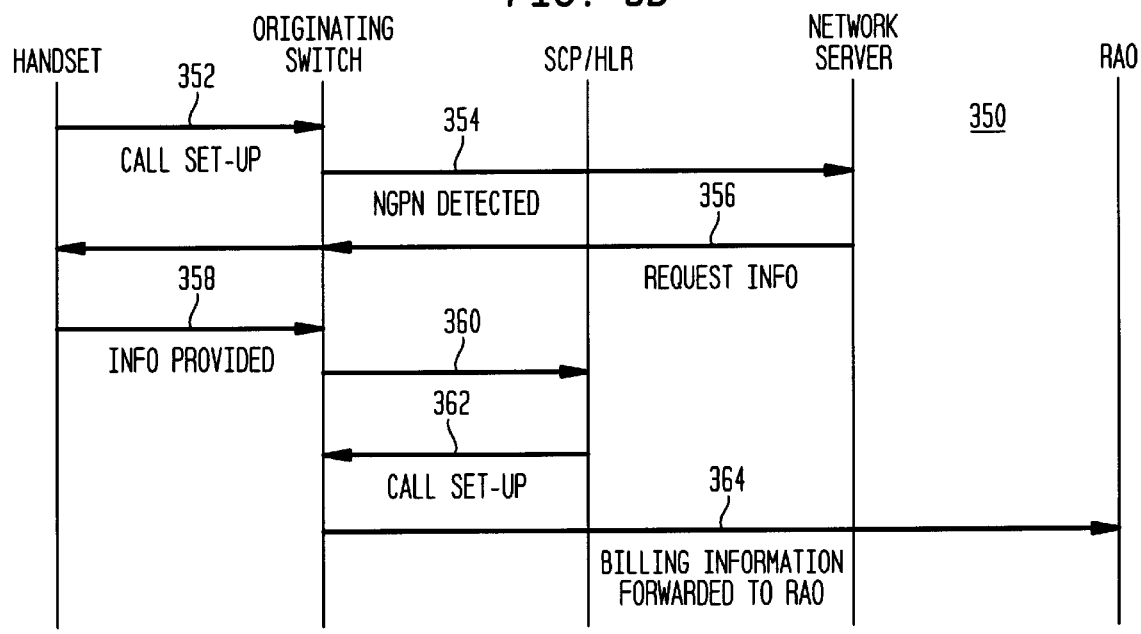

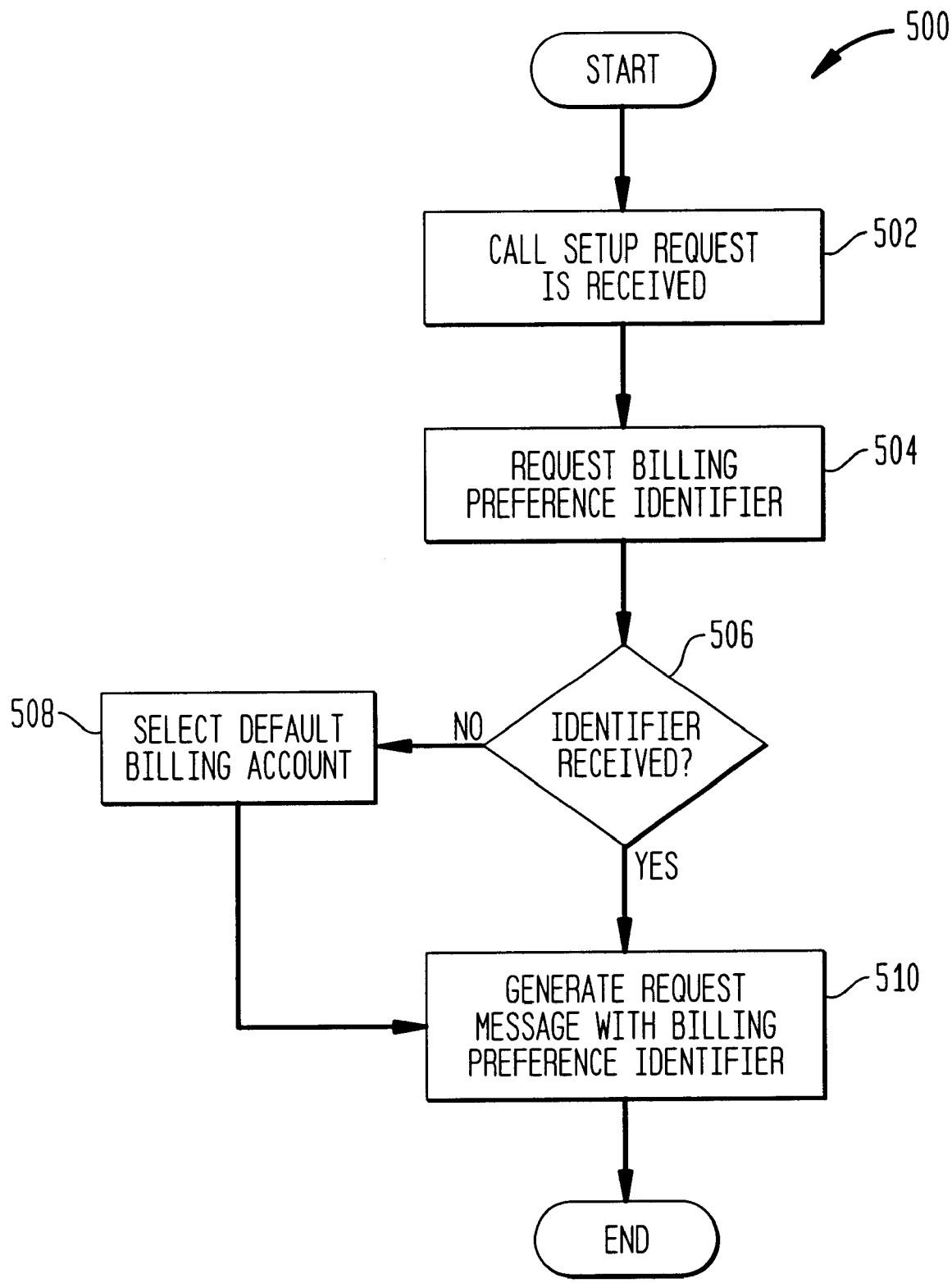

SELECTABLE BILLING OPTIONS FOR A SINGLE COMMUNICATIONS ACCOUNT

BACKGROUND OF THE INVENTION

1. Field of the Invention

The present invention is directed to telecommunications and, more particularly, to enabling telecommunications service subscribers to designate billing options on a per-call basis for both outgoing and incoming calls over a variety of wireline and wireless media. A service subscriber may establish a plurality of service accounts and designate to which of these accounts the charge for a particular call is to be billed.

2. Discussion of Related Art

FIG. 1 is a greatly simplified illustration of a communications network called a Personal Communications System (PCS) network 100. The PCS is similar to other types of communications networks and is described to provide background to the following discussion of the invention; it is not intended to limit the invention to use with only PCS systems. Indeed, a person skilled in the art will readily appreciate that the invention may be used in many types of communications systems. The PCS 100 includes a signaling network 102, which supports a switched communications network. A switched communications network may be, for example, a public switched telephone network (PSTN) or an Integrated Signaling Digital Network (ISDN). The signaling network 102 is connected to a wireless communications system 104. A PCS subscriber may send and receive voice messages, e-mail, faxes and other types of communication. Also, a PCS subscriber may link several telephone numbers (or addresses) to the same PCS account. For example, the subscriber's PCS account may include a home telephone number, a wireless telephone number, an office telephone number, and a pager number.

An illustrative signaling network 102 includes (among other things) a network 30 database 105, which may be a service control point (SCP). A database called a Home Location Register (HLR) 106 is part of the signaling network. The network may also include a network server 107, such as a Bellcore proprietary Intelligent Services Peripheral (ISP). The HLR 106 is connected via a link 108 to a Regional Signaling Transfer Point (RSTP) 110. The RSTP 110 is connected via a number of links 112 to several Local Signaling Transfer Points (LSTPs) 114. Each LSTP 114 is connected via a number of local links 116 to a number of central office switches such as Service Switching Points (SSP) 118. The SSP 118 connects to a customer premises to provide for premises equipment, such as a wireline telephone 120. An SSP 118 may also connect to one or more Wireless Switching Centers (WSC), Mobile Switching Centers (MSC), or Radio Port Control Units (RPCU) 122, which are part of the wireless communications system 104. The WSC (or MSC or RPCU) 122 is connected to a number of Base Stations (BS) (or Radio Ports (RP)) 124, which monitor a "cell" (or "coverage area") 126. One or more WSC 122 are connected to a second database called the Visiting Location Register (VLR) 128.

The HLR 106 contains a database maintained by a subscriber's local communications service provider at the subscriber's home location. This database, which may include information about the subscriber, is called the subscriber's user profile. The VLR 128 is maintained by a communications service provider at the location the subscriber and calling device 130 are visiting. The calling device (or handset) 130 may be a wireless telephone, a personal digital assistant (PDA) having wireless communication applications, or other device. The VLR 128 stores a subset of the HLR 106 subscriber information, and records that the calling device 130 is currently located in the area serviced by that VLR. The HLR 106 keeps a record of the VLR in which the calling device is currently located. When the calling device 130 travels to an area covered by a different WSC 122, the device is registered in the new WSC 122. The new location is stored in the VLR 128. If the calling device 130 travels to an area covered by another VLR 128, the subset of the HLR 106 data stored in the previous VLR is transferred to the new VLR. The location of the new VLR is stored in the HLR and the previous VLR location is deleted from the HLR 106.

Wireless communications services are provided by wireless communications service providers, which may or may not also be local telephone service providers. Some wireless services, such as PCS service, do not use geographic telephone numbers. A geographic telephone number typically includes an area code and a three digit number called the exchange. The area code and exchange provide information about the location and signaling network database of the telephone (or other communications device). Telephone numbers not having this information are called non-geographic telephone numbers or NGPN and do not contain the information identifying the subscriber's signaling network database, which contains, for example, the service provider's HLR containing the subscriber's user profile. They also do not contain the information identifying the service provider serving that subscriber, from which the identity of the signaling network database may be obtained. Non-geographic telephone numbers are described in more detail in U.S. patent application Ser. No. 08/592,212 filed on Jan. 26, 1996, entitled "Method and Apparatus Supporting Non-Geographic Telephone Numbers." Moreover, as described above, a PCS account may include a number of telephone numbers (or addresses), such as office and home wireless telephone number, a non-geographic wireless telephone number, and a pager number.

Billing for conventional/wireless telephone services is currently provided on an item-per- communications-line basis. In other words, the bill is primarily associated with the physical access line to the telephone network, and not to the telephone instrument or the caller. Some wireless communications services may provide a small degree of billing preference selection. Calling card services, for example, enable callers to use a calling card to bill a call to a specific account, but involve lengthy dialing codes and personal identification numbers (PINS) for security. Moreover, a caller could not, for example, use the same calling card for personal and business calls and have the usage charges separated.

Some interexchange carriers enable users to select among service accounts by dialing an access code (up to 4 additional DTMF digits) after the called party's number has been dialed. This access code can be used to itemize the monthly bill for the caller's physical access line according to the access codes. This method does not provide for a subscriber selecting billing preferences using more than one number or access line. This may be desireable, however, because a PCS subscriber may have several numbers (or addresses) in a single account.

Moreover, neither of the above billing preference selection methods provides for billing preferences for incoming calls (for example, toll free number service subscribers or wireless communications subscribers that are billed for air time of incoming calls). Some interexchange carriers itemize toll free number customer monthly bills by calling number, area-code of calling number, time-of-day, etc., of an incoming call, but do not allow users to specify service accounts on a per-call basis. Default billing account designations for specified numbers are currently not available as a service to recipients of calls.

Personal Communications Services (PCS) subscribers originate calls from different access lines (home or office phone or fax, or wireless telephone). Moreover, wireless calls may originate from different locations as they move from place to place within a PCS service area. The subscriber may desire the ability to designate different billing accounts on a per-call basis. Thus, it is preferable for calls originated from one or more access lines and for different purposes (personal, business, business relating to a particular client or matter, etc) to be itemized separately on the subscriber's bill. Because wireless communications subscribers are billed for airtime for incoming calls, it is also preferable for calls received from different numbers to also be itemized on a caller's bill. As used herein, the term "calls" may refer to voice, paging, e-mail, fax, multimedia or other communications via the communications network. Also, it may be desirable for a service subscriber to maintain records of time spent on telephone conversations. An attorney, for example, may want to keep track of time spent talking about a particular matter, regardless of whether the call originated from the subscriber or elsewhere.

A problem to be solved in providing such a service to PCS users is that a subscriber may use different wireline or wireless access lines to originate or receive calls and may have a non-geographic telephone number, i.e., one which is not tied to a specific access line. A second problem to be solved is that subscribers who are to be billed for received calls (e.g., users with toll-free numbers or wireless devices) may wish to designate billing accounts for incoming calls on a per-call basis. A third problem to be solved is that subscribers may wish to keep a record of time spent discussing a particular matter. A fourth problem to be solved is that subscribers may wish to designate default billing preference designators for particular numbers (such as frequently dialed number or numbers frequently calling the subscriber) or in the event that no billing preference designator is selected.

Therefore, it is an object of the present invention to enable communications network service subscribers to designate network usage allocation options on a per-call basis.

It is another object of the present invention to enable communications network service subscribers billed for incoming calls to designate billing options on a per-call basis.

It is yet another object of the present invention to enable communications network service subscribers having non-geographic telephone numbers to designate network usage allocation options on a per-call basis.

It is a further object of the present invention to enable communications network service subscribers to designate network usage allocation options on a per-call basis regardless of the calling device used or the location of wireless or wireline access to the communications network. It is an even further object of the present invention to provide default billing preference designators.

It is yet a further object of the present invention to provide the communications network service subscribers with a record designating a matter and time spent on a particular incoming or outgoing call.

SUMMARY OF THE INVENTION

These and other objects are provided by the present invention. The present invention, referred to herein as Personal Billing Selection, enables a communications network service subscriber to designate options for allocating network usage for outgoing and incoming calls on a per-call basis, even if the subscriber's account includes several numbers or addresses. The present invention also preferably allows users to designate default network resource allocation accounts on a per-number dialed or received basis.

The subscriber may have a plurality of service accounts established in a database such as a service profile. The subscriber may, via an interface, provide a designator indicating an allocation designation for a particular communication, such as for personal use and calls for other uses (e.g., business calls, separate client accounts, etc.). This may be done on a per-call basis for both outgoing and incoming calls. For both outgoing and incoming calls, network usage may be automatically allocated to the appropriate service account. A predefined default billing (or other network resource allocation) preference designators can be specified for both originated and received calls. A default billing preference designator may also be provided for unspecified numbers or addresses. The allocation designation may be provided to a network database which handles network resource allocation, such as billing, so that the network allocation is associated with the particular communication.

In a first preferred embodiment, before a call set up message is sent to a communications network, the calling device prompts the subscriber to include a billing preference designator. This billing preference designator may be included in the call set up message to the originating switch. An originating switch recognizes that a billing preference designator is included in the message and forwards the information to a network database, such as a service control point. A network database obtains the billing preferences and determines the appropriate service account. The service account information is sent to the originating switch and the call may proceed in the ordinary manner. When the call is complete, the originating switch sends the billing information, including the service account information, to an appropriate billing database.

In a second preferred embodiment, a subscriber originates a call which is routed by an originating switch. An originating switch recognizes that the call is from a Personal Billing Selection subscriber. The originating switch then contacts a network server which prompts the subscriber's communication device to include a billing preference designator in the communication. The subscriber, via an interface on the communication device, provides a billing preference designator which is then forwarded to an appropriate billing database. The billing database may obtain a billing preference designator to service account conversion which maps the designator to a service account. Then the call may proceed in the ordinary manner.

In a third preferred embodiment, a Personal Billing Selection subscriber's communication device receives a call. After the call has been established, the subscriber may provide a billing preference designator by indicating to the network that a billing preference designator is going to be provided. This may be done, for example, using a switch hook flash. The subscriber may then provide the billing preference designator. The switch hook flash or other indicator is detected by the terminating switch which is then alerted to wait for the billing preference designator. When the terminating switch receives the billing preference designator, it forwards this information to the originating switch. (Alternatively, this information may be forwarded at a future time.) The call may proceed in the ordinary manner.

After the call is complete, the originating switch sends the billing information, including the billing preference designator, to the appropriate billing database where the billing designation is associated with service account information.

Default billing preferences may be provided. First, predetermined numbers, such as frequently called (or frequently calling) numbers (or addresses), may be set out in a table associating a number with a default billing designator. Outgoing calls to (or incoming calls from) these numbers (or addresses) may be automatically provided with the default billing preference designator for that number in the table. Alternatively, if no billing preference designator is provided for an outgoing or incoming call, a default billing preference designator may be provided for that call.

Personal Billing Selection used for originating calls differs from previous services offered by interexchange carriers because Personal Billing Selection subscribers may obtain bills itemized by service account even if calls originate from different physical locations, using different wireless or wired access lines or different calling devices. Personal Billing Selection further differs from prior services by permitting billing preferences to be selected for incoming calls. Default billing account designation differs from prior services in allowing multiple numbers to be grouped into one account as well as being available for both incoming and outgoing calls.

BRIEF DESCRIPTION OF THE DRAWINGS

The present invention is described with reference to the following figures:

FIGS. 3A–3C are call flow diagrams illustrating the operation of preferred embodiments of the present invention;

FIG. 5 is a flow chart of an illustrative user interface of a handset operating according to a preferred embodiment of the present invention.

A glossary of acronyms used herein is attached as Appendix A.

DETAILED DESCRIPTION OF PREFERRED EMBODIMENTS

For clarity of presentation, the detailed description is set out in the following subsections:

I. Overview of the Invention

An overview of the invention is provided with reference to FIGS. 2A, 2B, 3A, 3B, and 3C. The overview describes the inventive structure, Personal Billing Selection for outgoing calls, Personal Billing Selection for incoming calls, and default billing.

II. The Handset

Modifications to the operation and structure of a standard handset for use in certain preferred embodiments of the present invention are described with reference to FIGS. 4 and 5.

III. The Handset/Network Interface

The interfaces (1) between a handset and a wireless communications network and (2) between a handset and a wireline communications network according to preferred embodiments of the present invention are described.

IV. The Central Office Switch

Modifications to a preferred central office switch operating as an originating switch and operating as a terminating switch are described.

V. The User Profile

A user profile according to a preferred embodiment of the present invention is described.

VI. Conclusion

A conclusion is provided.

Figure 1:
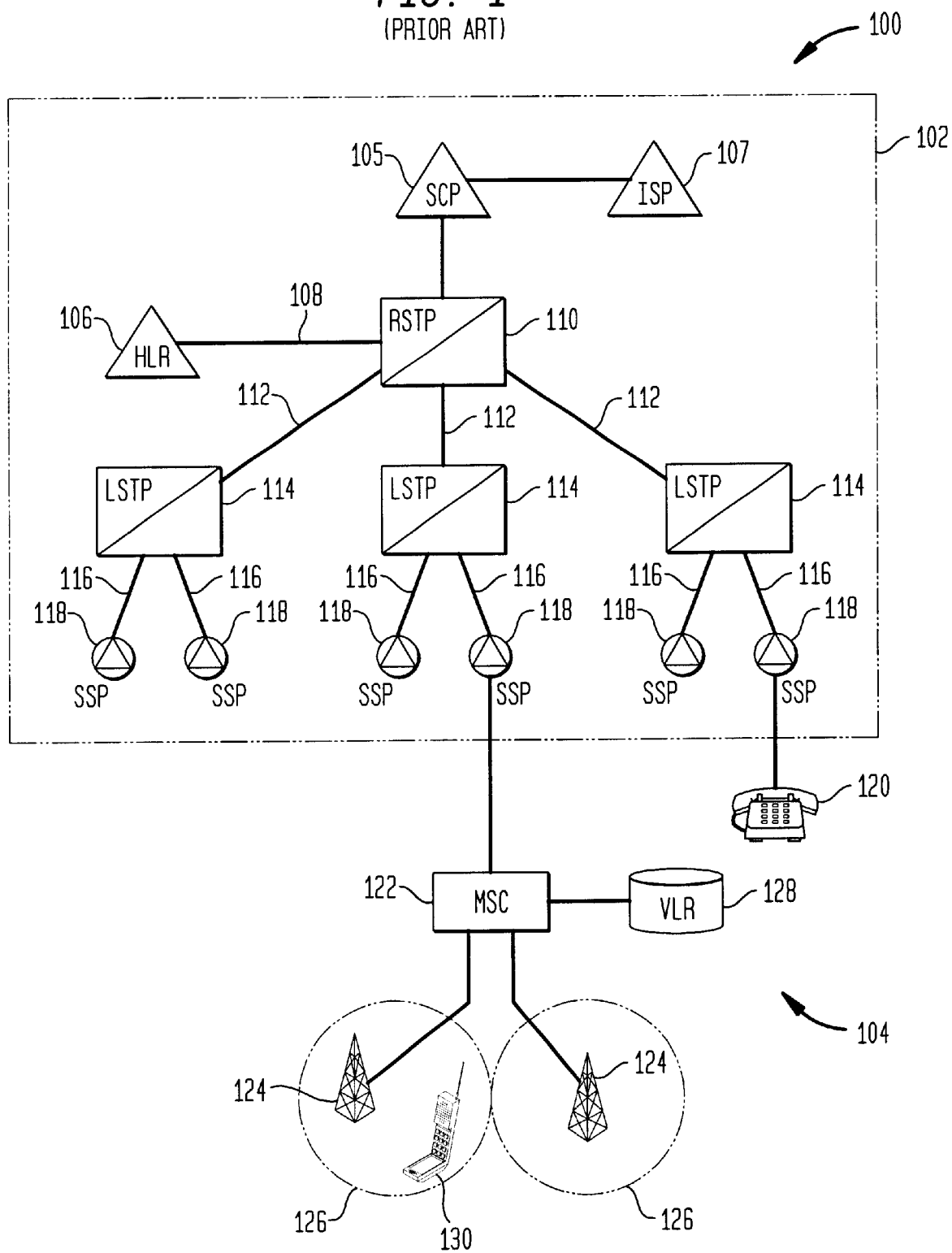
FIG. 1 is a diagram of an illustrative communications system.
Figure 2A:
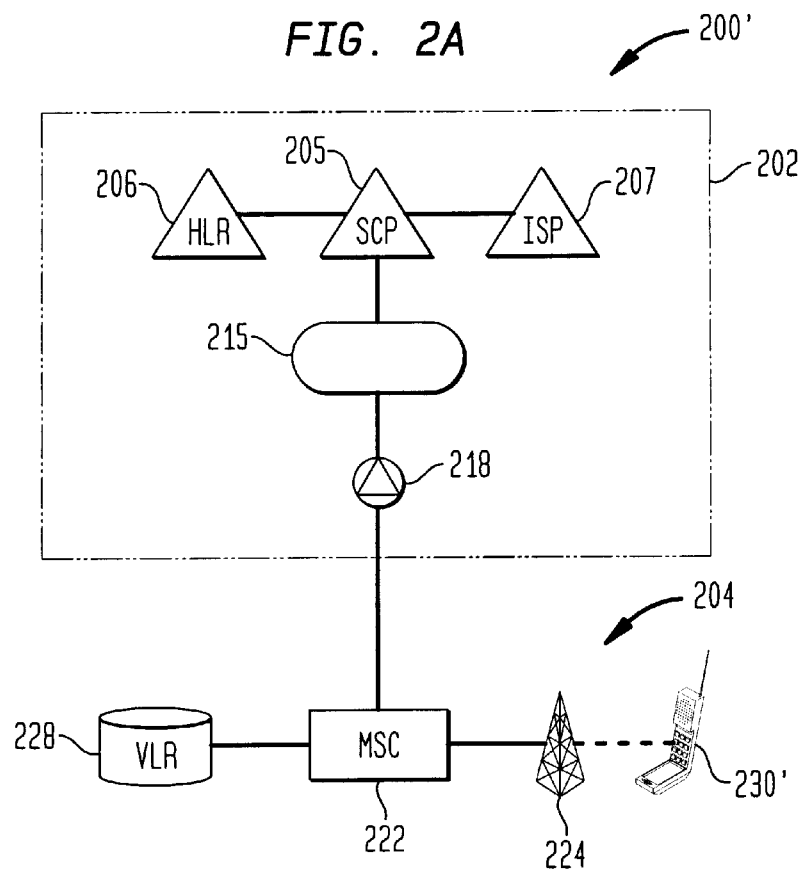
FIGS. 2A and 2B are diagrams illustrating preferred embodiments of the present invention.

1. Overview of the Invention a. Overview of a Preferred Structure of the Present Invention FIG. 2A illustrates a communications network 200' for performing a first preferred embodiment of the present invention. This first embodiment of the invention includes a communications device, such as a digital cellular telephone, personal digital assistant, or other device, 230' (herein referred to as a "handset") in wireless communication with a base station 224. The base station is connected to a MSC 222. The MSC is connected to a VLR 228 and to a switch 218 in the switched communications network 202. The switched communications network 202 includes a switching network 215, SCP 205, HLR 206, and network server 207.

Figure 2B:
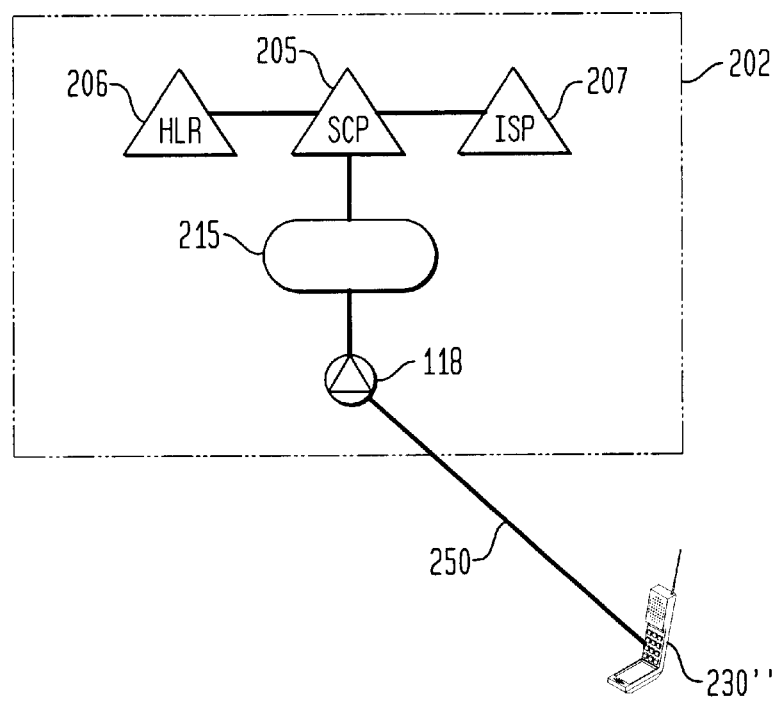

FIG. 2B illustrates a communications network 200" for performing a second preferred embodiment of the present invention. This second embodiment is similar to the embodiment of FIG. 2A, except the handset 230" is connected via a wireline 250 to the switch 218. A PCS subscriber account, for example, may include both wireline and wireless handsets, pagers, etc.

b. Personal Billing Selection for Outgoing Calls

Implementation of Personal Billing Selection for originating calls, such as PCS subscribers, may preferably be accomplished by one of the two following methods.

Method 1: FIG. 3A illustrates an exemplary call flow 300 which may be performed by the structure of FIGS. 2A and 2B using a first method. A call is originated via the handset 230', which may be modified to include software which prompts the user for a billing preference designator. The handset 230' (or 230") appends a billing preference designator to the call set up message. This designator may be one or more bits in the message header or other identifier in the message. (A preferred user interface for billing preference designation is described below.)

The message is forwarded to a central office (originating) switch 218 (line 302). The call set up message is received at the central office switch either via a wireless connection, as seen in FIG. 2A, or via a wireline connection, as seen in FIG. 2B. The originating switch 218 receives the message and determines that the message originated from a PCS subscriber, non-geographic telephone number, or other Personal Billing Selection subscriber. For example, if the user is calling from a phone with a fixed access line, the originating switch uses the number associated with the access line to determine the caller. The originating switch 218 parses the call set up message into its components. The origination switch 218 may be modified to look at particular bits in the header for a billing preference designator. The presence of a billing preference designator or the calling number in the setup message instructs the switch to query the subscriber's user profile to obtain service account information (line 304). This query may be directed to the SCP 205 via the signaling network 215. The SCP 205 retrieves the service account information. If the service account is located in an HLR 206, the SCP 205 determines the appropriate HLR for the subscriber and retrieves the service account information from the HLR (line 306). The SCP 205 returns the service account information to the originating central office switch 218 (line 308), and the call may then proceed in the usual manner.

The central office switch is also adapted to receive the service account information and maintain the billing preference designator so that network usage allocations can be directed to the service accounts corresponding to the billing preference designator. Network usage and other information pertinent to the call are associated with the designated service account. After the call is complete, the service account information for that call is forwarded to an appropriate network usage allocation database, such as the SCP or HLR (lines 310, 312) or a Revenue Accounting Office (RAO). Subscriber network usage allocation information is then aggregated by service account and the subscriber may receive a statement with usage allocation separated according to service accounts.

Implementation of Personal Billing Selection according to this method preferably uses modifications to existing telecommunications equipment. Handsets may be augmented with a user interface to prompt the subscriber for a billing preference designator and to append the billing preference designation to the call set up message. The handset/network message protocol may be extended to include the billing preference designator in the signaling specification. The central office switch may be modified to recognize the presence of the billing preference designator and to generate a query to the customer information database. The customer information database may include a table of service accounts for the subscriber.

Method 2: FIG. 3B illustrates an exemplary call flow 350 which may be performed by the structure of FIGS. 2A or 2B using a second method. A call set up from a handset 230' (or 230") message is forwarded to a central office (originating) switch (line 352) to collect billing preference designators. The switch determines from the calling number or physical access line that the call originated from a PCS subscriber, non-geographic telephone number, or other Personal Billing Selection subscriber, thus indicating that the call is to be given special handling. The switch forwards the setup to a network server (line 354). The network server requests additional digits from the user (line 356) using a voice or other message (i.e., a text message for the handsets display). The subscriber provides additional information or digits representing the billing preference designator by issuing a voice command, like "personal", "business", etc., or by pressing DTMF buttons in response to a prompt (line 358). The switch forwards the billing preference designator to a network database (such as an SCP or HLR) (line 360). The database uses the subscriber's non-geographic number plus the selected billing preference designator to access the subscriber's billing records. The database may convert the billing preference designator (e.g., 1,2,3 . . . or "personal", "business") to a service account. The call set up may then proceed in the ordinary manner (line 362). At the end of the call, the originating switch sends the billing information to the RAO (line 364). The RAO produces network allocation statements based on billing records. The network usage for the call is allocated to the appropriate service account.

Thus, the central office switch may be modified to detect calls originating from a Personal Billing Selection subscriber, contact the network server, receive the billing designator from the user, and forward this information to the appropriate database.

c. Personal Billing Selection for Incoming Calls

Figure 3C:
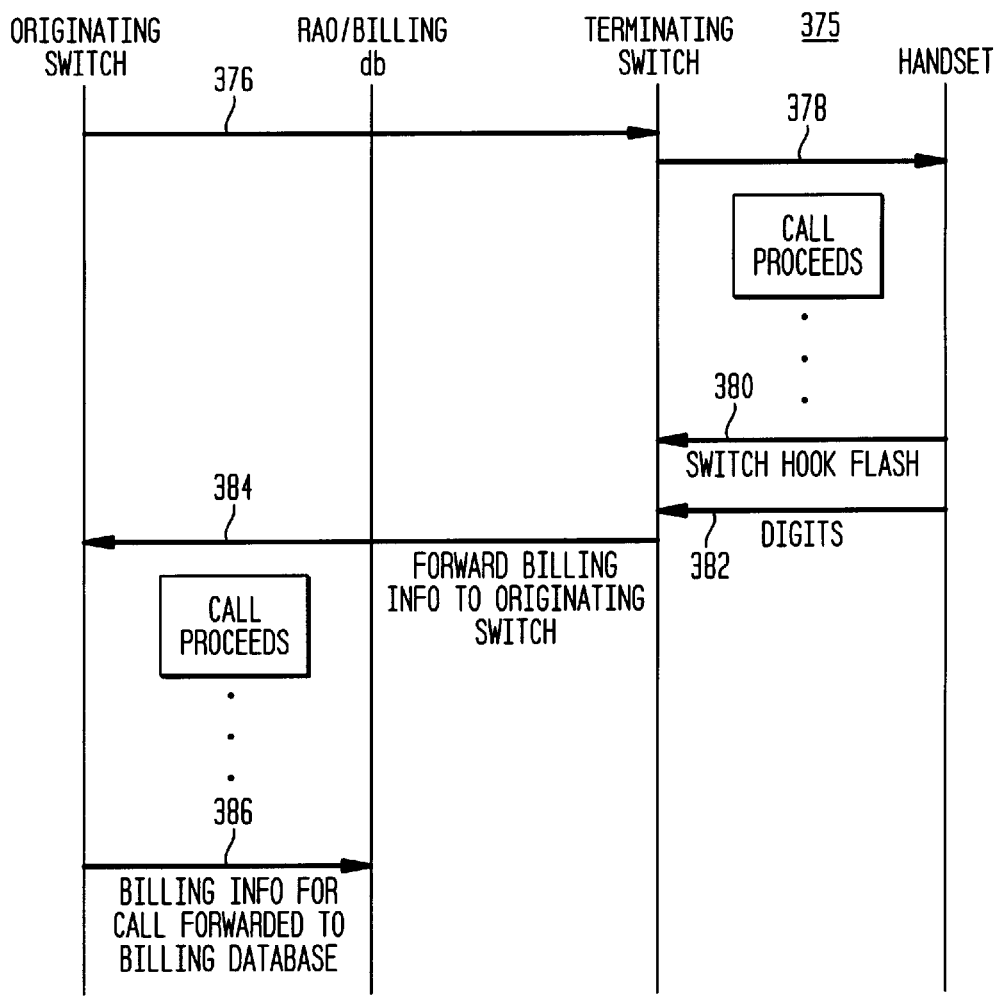

FIG. 3C illustrates an exemplary call flow 375 which may be performed by the structure of FIGS. 2A and 2B for providing Personal Billing Selection on received calls.

A call is sent from an originating switch to a terminating switch 218 (line 376). The terminating switch detects that the call is directed to a Personal Billing Selection subscriber. The call is then sent to the handset 230' (or 230") (line 378). The called party (the subscriber) may determine the caller's identity by either "Caller ID" service or if the caller has blocked delivery of Caller ID, by picking up the handset and speaking with the caller. The terminating switch stores the called number and indicates that Personal Billing Selection is available to the called party (the subscriber).

Once the called subscriber has determined the identity of the caller, at any point in the call, the subscriber can indicate to the network that a billing preference designator is being transmitted. This may be done for example, by pressing the handset hook, causing a "switch-hook flash." The switch-hook flash is detected by the terminating switch (line 380). The switch-hook flash (or other indicator) indicates to the central office (terminating) switch 218 that the call requests intervention. The called subscriber then provides a billing preference designator (preferably preceded by a code alerting the terminating switch that a billing preference designator follows rather than a service request such as a call transfer) such as by dialing or voice commands. The designator is received at the terminating switch (line 382). The billing designator may be dialed at any time before the call is terminated because billing or other service account information is recorded at the end of the call. The terminating switch forwards the billing preference designator to the originating switch (line 384), which inserts this information into the network usage service account information which is sent to the network usage allocation database, such as an RAO, at the end of the call (line 386). Alternatively, the terminating switch queries to the appropriate database storing the called subscriber's profile and obtains the default billing preference designator. The time for the incoming call to the subscriber (such as a toll free number or wireless air time) is allocated to the service account indicated by the billing preference designator.

Implementing Personal Billing Selection for incoming calls may necessitate modification to existing network elements. These modifications may include updating the networks elements' software to perform the following functions. The terminating switch 218 stores the called number to reflect that Personal Billing Selection is activated for that number, and recognizes that the digits following the switch-hook flash or other indication are interpreted as a billing preference designator. The terminating switch forwards this information to the originating switch, which then stores this information in an appropriate billing information field. Finally, the database interprets the information from the originating switch to allocate the call time to the appropriate service accounts. A person skilled in the art readily recognizes that such software modifications may be made in any conventional manner, and therefore these modifications are not further described herein.

d. Default Billing Preference Designators for Personal Billing Selection

For either outgoing or incoming calls, default billing preferences may be selected. This default preference may be used to eliminate repetitive selection of commonly used designators and/or to provide a billing preference in the absence of a selection.

Implementing default billing preference designators for Personal Billing Selection preferably includes the following steps. A user profile is maintained for the subscriber in a network database (e.g., the SCP or HLR) which contains services account information for the Personal Billing Selection subscriber. The database may include a table of called numbers (or addresses) (outgoing calls) or calling numbers (incoming calls) which may be mapped to service accounts to which network usage may be allocated. Such a table may be:

| TELEPHONE NO. | DEFAULT BILLING DESIGNATOR | SERVICE ACCOUNT |
|---|---|---|
| 516-555-1234 | 0 | Personal |
| 516-555-0022 | | |
| 201-555-5678 | 1 | Business Account, client 3506 |
| 011-886-35-555555 | 2 | Business Account, client 3511 |
| 212-555-9012 | 3 | Business Account, General |
| 212-555-3138 | | |

Note that more than one telephone number may be associated with a service account.

When a call is originated by the subscriber from either a wireline or wireless handset, the originating switch detects that the caller is a subscriber to Personal Billing Selection. This may be done by the switch recognizing that the calling number is a Personal Billing Selection Subscriber and thus special handling is desired. In any case, the originating switch queries the appropriate database storing the user profile and obtains the default billing preference designator for the called numbers. This default billing preference designator may be inserted into the fields prepared by the originating switch for usage allocation information.

When a call is received by a subscriber, the terminating switch detects that the called party is a subscriber to Personal Billing Selection in the same manner as described above. The terminating switch queries the appropriate database storing the subscriber user profile and obtains the default billing preference designator. The terminating switch then forwards this information to the originating switch, which inserts the usage allocation information.

Also, a default billing preference designator may be selected when no selection is made and no default designator is found in the database. Thus, if no billing preference designator is selected before transmitting a call set up message or during an incoming call, the usage allocation information is included in a default service account.

2. The Handset

A handset performing Method 1 above preferably is modified. The modifications include a user interface enabling a billing preference selection and a modification to the physical layer of the handset to add a billing preference designator to the message header. Preferably, a failure to specify a billing preference results in the selection of a preselected default billing option.

Figure 4:
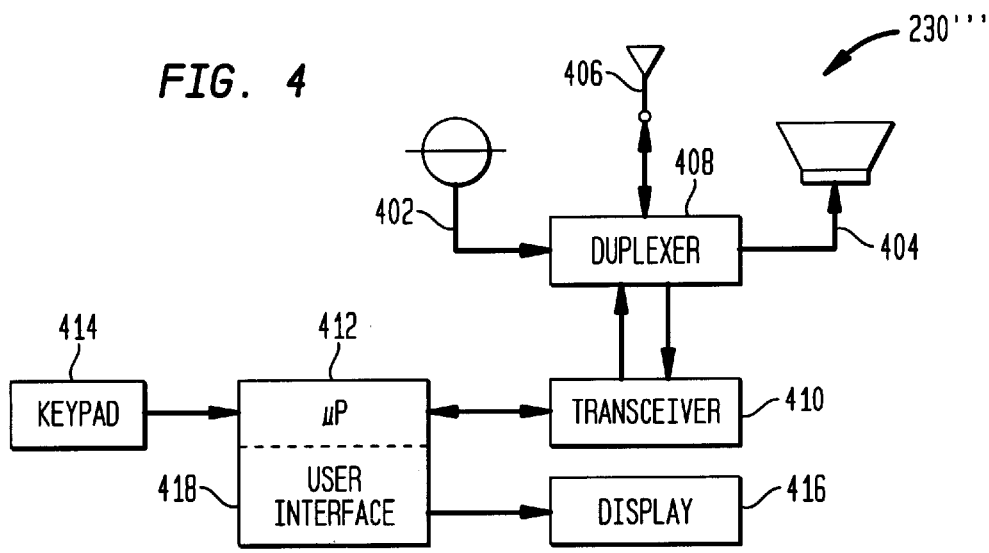
FIG. 4 is a block diagram of an illustrative handset according to a preferred embodiment of the present invention.

FIG. 4 is a block diagram of an exemplary handset 230''' for performing Method 1 according to a preferred embodiment of the present invention. This illustrative handset 230''' is a wireless handset, but a person skilled in the art recognizes that a wired handset or other communications device, such as a personal digital assistant, is equally suitable for the present invention. The handset 230''' has a microphone 402, a speaker 404, and an antenna 406, all of which are connected to a duplex filter 408. The duplex filter is connected to a transceiver 410. The transceiver is connected to a processor 412 such as a digital signal processor or microprocessor. The processor is connected to a keypad 414 and a display 416. The processor includes a user interface 418 that enables the end user to specify a billing preference for each call.

FIG. 5 is a flow chart 500 illustrating a preferred operation of the user interface 418. The user interface 418 may be stored, for example, in the processor 412 which receives a call setup request (i.e., a dialed number) (step 502) from the keypad 414. The user interface 418 issues a prompt on the display 416 for the subscriber to select a billing preference (step 504). The subscriber may provide a billing preference by, for example, pressing one or a sequence of buttons on the handset keypad 414; alternatively, the subscriber may not select a billing preference (step 506). If no preference is selected, a preselected default billing preference designator pre-programmed in the user interface may be automatically selected (step 508). The processor 412 generates a call set up message including the billing preference designator (step 510).

The modification to the physical layer may include an additional field in the call set up message header or, alternatively, modifying an existing field in the header to include a billing preference designator. In either event, the user interface enables a billing preference designator to be included in the header. If the header field billing preference designator contains two bits, four billing preference designators may be provided. That is, 00, 01, 10, and 11 may each designate a billing preference. One of these designators (such as 00) may be a default designator if no designator is selected by the user. Naturally, additional bits in the header for billing preference may provide for additional billing preference choices.

3. The Handset Network Interface

The handset may interface with the communications network through either a wireless or wireline interface.

The handset wireless network interface is preferably a standard wireless interface, except that the interface may be modified to accept a header having an additional field for a billing preference designator (if an additional field is added). The interface may also be modified to handle a hook flash or other indication for designating a billing preference designator for an incoming call.

A person skilled in the art recognizes that the handset wireline interface may be a standard wireline interface. The interface may be modified to handle a hook flash or other indication for designating a billing preference designator for an incoming call. A person skilled in the art recognizes that these modifications are straightforward. Indeed, for the wireline interface, the modifications are not unlike current call waiting services.

4. The Central Office Switch

The central office switch receives the call set up message or switch hook flashes from a handset via the handset-network interface. The central office switch, acting as either an originating or terminating switch, preferably performs several functions to facilitate Personal Billing Selection.

a. Operating As An Originating Switch For Outgoing Calls
   i. Method 1
   Method 1 and modifications to the originating switch are described with reference to FIG. 3A above.
   2. Method 2
   Method 2 and modifications to the originating switch are described with reference to FIG. 3B above.
b. Operating As A Terminating Switch For Incoming Calls
   A preferred method for providing Personal Billing Selection for incoming calls and modifications to the terminating switch are described with reference FIG. 3C above.

5. The User Profile

A user profile is typically a database stored in a communications network element or peripheral device. The user profile may be maintained, for example, in an SCP 205 or HLR 206 or other network database. A subscriber's user profile typically contains user information such as the subscriber's name, address, preferred long distance carrier, service features (e.g., call forwarding and call restriction), billing, and other administrative related information.

A user profile for a Personal Billing Selection subscriber may include a billing (network resource allocation) preference table of billing preferences. This table provides a mapping of the billing preference designators and service account descriptions. This table may be used either when the user has entered a designator or when a default designator is used. For example, if the PCS header described above is modified to include two bits of billing preference information, the subscriber's user profile database may include a table such as the following:

| Header Entry | Service Account Description |
|---|---|
| 00 | Personal Account |
| 01 | Business Account, Client Number 3506 |
| 10 | Business Account, Client Number 655321 |
| 11 | Business Account, General; Default Account |

Thus, if the billing preference designator selected by the subscriber generates 00 in the header (such as may be performed by the user interface described with reference to FIG. 5 above), this code is received by the user profile. The user profile consults the table and allocates the time of the call to the subscriber's personal service account. If 01, 10, or 11 are generated, the user profile allocates the time of the call or other network usage information to the appropriate service accounts. Typically, the user interface/physical layer of the handset selects a default header if no billing preference is selected. Alternatively, it is possible to indicate a default account on the user profile table, as shown in this table, in the event that no selection was made.

The service accounts are established by the subscriber when the Personal Billing Selection service is initiated. The user profile is updated to include a table of billing preference designators (header entries) and corresponding service account descriptions. A user profile may be updated by contacting the telecommunications service provider or by the subscriber accessing the profile. One method of a subscriber accessing and updating a user profile is described in U.S. patent application Ser. No. 08/466,625 entitled "A Method for Remotely Updating a User Profile In a Communication Network", filed on Jun. 6, 1995.

6. Conclusion

A method and network apparatus for enabling a communications service subscriber to select billing preferences is described. Preferences may be selected for incoming or outgoing calls.

The above described embodiments of the invention are intended to be illustrative only. Numerous alternative embodiments may be devised by those skilled in the art without departing from the spirit and scope of the following claims. For example, this invention has been described with reference to a PCS communication system. A person skilled in the art readily recognizes that the invention may be adapted for use with other communications systems. Moreover, the invention has been described with reference to voice communication and telephone numbers, but may equally be adapted for use with other types of communications, such as e-mail, multimedia, paging, etc. using Internet addresses or other communications addresses. A person skilled in the art also readily recognizes that the invention may be used for any allocation of network usage and not only for billing.

We claim:

1. A method for allocating communication network resources for a communication originating from a communication device of a network subscriber, comprising the steps:

before the communication network receives the communication, including a network resource allocation designator in the communication, said including step further comprising providing a table of default network resource allocation designators with communication addresses, and using the table to select a network allocation resource designator for the communication according to a communication address of the communication;

sending the communication having the network designator to the communication network;

the communication network forwarding the network allocation designator to a network database; and the network database associating the network allocation designator with service account information for one of a plurality of service accounts.

2. The method of claim 1, wherein after the step of associating, the method further comprising the step of the network database forwarding service account information to a switch.

3. The method of claim 2, further comprising after the communication has ended, the switch forwarding network resource allocation information and the service account information to a network resource allocation database.

4. The method of claim 1, wherein the step of including a network resource allocation designator in the communication further comprises the communications device prompting the user to include the network resource allocation designator.

5. The method of claim 4, wherein the step of including a network resource allocation designator in the communication further comprises the communication device appending the network resource allocation designator to a call set up message.

6. The method of claim 1, wherein the step of sending the communication having the network allocation designator to the communications network further comprises the step of forwarding the communication to an originating switch.

7. The method of claim 6, wherein after the communication is forwarded to the originating switch, the originating switch determining that the communication originated from a network subscriber.

8. The method of claim 7, wherein after the originating switch determines that the communication originated from a network subscriber, querying a profile of the network subscriber to obtain service account information.

9. The method of claim 8, further comprising retrieving the service account information and providing the service account information to the originating switch.

10. The method of claim 9, wherein after the service account information is provided to the originating switch, the originating switch maintaining the network allocation designator so that network usage allocations are directed to a service account associated with the network allocation designator.

11. A method for allocating communication network resources for a communication originating from a communication device of a network subscriber, comprising the steps of:

the communication device routing the communication to a switch;

the switch determining that the communication originated from a network subscriber;

the switch contacting a network database;

the network database prompting the communications device to include a network allocation resource designator in the communication, the step of including a network resource allocation designator in the communication further comprising:

providing a table associating default network resource allocation designators with communication addresses; and using the table to select a network allocation resource designator for the communication a address of the communication; and the communications device receiving the network allocation resource designator and forwarding the designator to a network resource allocation database.

12. A method for allocating communication network usage for communications that are received by a network subscriber, comprising the steps of:

a communication device of the network subscriber receiving a communication;

indicating to the network that a network allocation resource designator will be provided;

providing a network allocation resource designator, the step of providing the resource allocation designator further comprising providing a table associating default network resource allocation designators with communication addresses, and using the table to select a network allocation resource designator for the communication according to a communication address of the communication;

the communications network forwarding the network allocation designator to a network database; and the network database associating the network allocation designator with service account information.

13. The method of claim 12, wherein after the step of associating, the method further comprising the step of the network database forwarding the service account information to a terminating switch.

14. The method of claim 13, wherein the terminating switch forwards the service account information to an originating switch.

15. The method of claim 12, further comprising after the communication has ended, the switch forwarding network resource allocation information and the service account information to a network resource allocation database.

16. The method of claim 12, wherein the step of indicating to the network that a network allocation resource designator will be provided further comprises causing a switch-hook-flash.

* * * * *